US009886466B2

(12) United States Patent
Parikh et al.

(10) Patent No.: US 9,886,466 B2
(45) Date of Patent: Feb. 6, 2018

(54) OPTIMIZING SPACE MANAGEMENT OF TABLESPACES IN DATABASE SYSTEMS

(71) Applicant: International Business Machines Corporation, Armonk, NY (US)

(72) Inventors: Viren D. Parikh, Bangalore (IN); Ramesh C. Pathak, Bangalore (IN); Suryanarayana K. Rao, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/666,409

(22) Filed: Mar. 24, 2015

(65) Prior Publication Data
US 2016/0283503 A1    Sep. 29, 2016

(51) Int. Cl.
*G06F 17/30* (2006.01)
(52) U.S. Cl.
CPC .............. *G06F 17/30339* (2013.01)
(58) Field of Classification Search
CPC ........................................ G06F 17/30
See application file for complete search history.

(56) References Cited

U.S. PATENT DOCUMENTS

| | | | |
|---|---|---|---|
| 6,144,970 A | 11/2000 | Bonner et al. | |
| 6,668,263 B1 | 12/2003 | Cranston et al. | |
| 7,031,987 B2 | 4/2006 | Mukkamalla et al. | |
| 7,181,481 B2 | 2/2007 | Chen et al. | |
| 7,200,628 B2 | 4/2007 | Nakano et al. | |
| 7,299,243 B2 | 11/2007 | Maxfield | |
| 7,720,876 B2 | 5/2010 | Maxfield | |
| 7,873,684 B2 | 1/2011 | Souder et al. | |
| 7,890,541 B2 | 2/2011 | Teng et al. | |
| 7,895,247 B2 | 2/2011 | Hankin | |
| 9,208,094 B2 * | 12/2015 | Blinick | G06F 12/0848 |
| 2007/0168640 A1 * | 7/2007 | Hrle | G06F 17/30598 |
| | | | 711/206 |

(Continued)

FOREIGN PATENT DOCUMENTS

CA    2249080       3/2000
WO    2005043414 A2    5/2005

OTHER PUBLICATIONS

"Managing Tablespaces"; Oracle8i Administrator's Guide; Release 2 (8.1.6); Printed Nov. 20, 2014; <https://doc.oracle.com/cd/A87860_01/doc/server.817/a76956/tspac . . . >.

(Continued)

*Primary Examiner* — Khanh Pham
(74) *Attorney, Agent, or Firm* — Alexander G. Jochym

(57) ABSTRACT

A database is identified, wherein the database has two or more tablespaces. A local partition and a global partition for each tablespace of the two or more tablespaces is created, wherein the created two or more global partitions are included in a global storage pool. A request to move an object to a first local partition of a first tablespace of the two or more tablespaces is received. That an amount of used space of the first local partition is above a first threshold is determined. Responsive to determining that the amount of used space of the first local partition is above the first threshold, at least a portion of the object is stored in the global storage pool.

15 Claims, 3 Drawing Sheets

(56) References Cited

U.S. PATENT DOCUMENTS

2009/0030956 A1* 1/2009 Zhang ............... G06F 17/30595
　　　　　　　　　　　　　　　　　　　　707/999.205
2011/0125745 A1　　5/2011　Bright
2013/0097127 A1　　4/2013　Mohapatra et al.

OTHER PUBLICATIONS

Minoui, Hamid; "Practical Space Management in Data Warehouse Environments"; Database Specialists, Inc.; Copyright 2005 Database Specialists, Inc.; Printed Mar. 20, 2015.

* cited by examiner

OPTIMIZING SPACE MANAGEMENT OF TABLESPACES IN DATABASE SYSTEMS

BACKGROUND OF THE INVENTION

The present invention relates generally to the field of databases, and more particularly to optimizing space management of tablespaces in database systems.

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables, and each table will typically have multiple tuples and multiple columns. Tables are assigned to tablespaces.

A tablespace is a storage location, such as on a direct access storage device (i.e., magnetic or optical disk drives for semi-permanent storage), where the actual data underlying a database object is kept. It provides a layer of abstraction between physical and logical data and serves to allocate storage for all DBMS managed segments. The tablespace is a collection of storage containers (e.g., files) used to store data for database objects (e.g., relational tables).

SUMMARY

Embodiments of the present invention include a method, computer program product, and system for optimizing free space in a database. In one embodiment, a database is identified, wherein the database has two or more tablespaces. A local partition and a global partition of the two or more tablespaces is created, wherein the created two or more global partitions are included in a global storage pool. A request to move an object to a first local partition of a first tablespace of the two or more tablespaces is received. That an amount of used space of the first local partition is above a first threshold is determined. Responsive to determining that the amount of used space of the first local partition is above the first threshold, at least a portion of the object is stored in the global storage pool.

DETAILED DESCRIPTION

Figure 1:
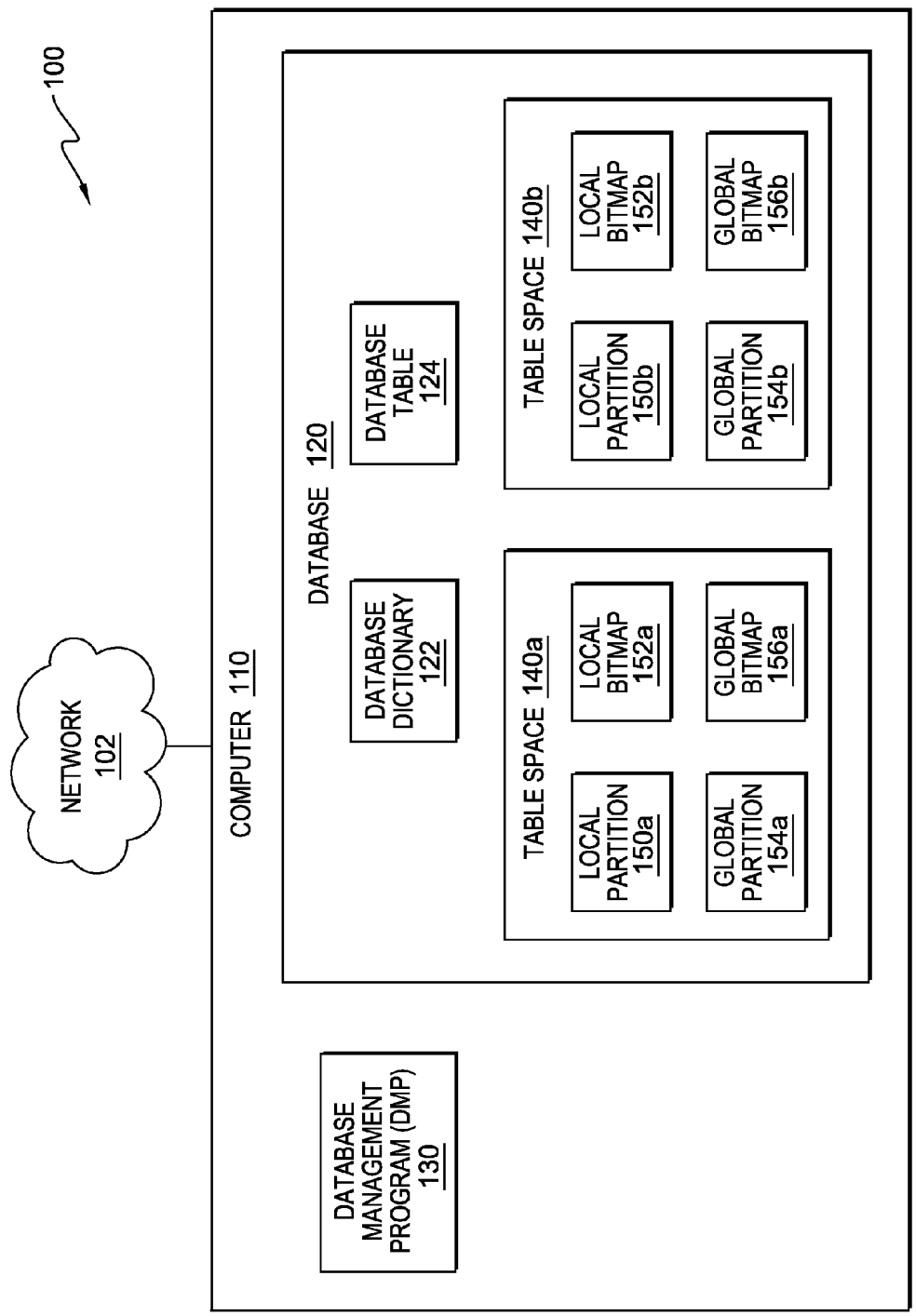
FIG. 1 is a functional block diagram of a data processing environment, in accordance with an embodiment of the present invention.

Embodiments of the present invention provide a flexible, automated, intelligent and smart database management system (DBMS). Embodiments of the present invention provide for the splitting of tablespaces in a database into two separate partitions. The first, local partition, provides for storing objects local to the tablespace the partition is associated with. The second, global partition, provides for storing objects local to other tablespaces in the same database that the partition is not associated with.

Embodiments of the present invention recognize that database administrators can spend a large amount of time, up to 50 percent, managing database space and ensuring that sufficient space is available to support the growth of business, recoverability requirements or disaster recovery system availability and currency of the critical applications and databases. Embodiments of the present invention recognize that a large percentage, up to 40 percent, of business outages are linked to dataspace management related issues. Often, database space allocation is very much skewed. The space is distributed within a database to different tablespaces, and each tablespace manages its own space independently. This leads to a situation in which one of the tablespaces becomes full and causes objects within the tablespace to be unable to extend which causes outages, and business processing comes to a halt even though there is sufficient free space in other tablespaces within the database. Embodiments of the present invention avoid skewed space distribution inside the database, avoid outages due to free space being used due to an abnormally high rate of space consumption by a process, avoid outages due to monitoring failures, avoid outages due to delay in human intervention/human errors, and provide additional monitoring at no extra cost.

Embodiments of the present invention allow for the sharing of space between different tablespaces in the same database. Embodiments of the present invention allow for dynamically borrowing and lending of space between partitions of tablespaces. Embodiments of the present invention provide algorithms to identify suitable candidate global partitions from a list of potential global partitions that will provide needed storage space to local partitions facing capacity threats. Embodiments of the present invention provide algorithms to optimize writing back data from global partitions to their parent local partition upon the local partition having enough free space to provide for the data. Embodiments of the present invention provide modules for keeping track of the space utilization in database tablespaces, including their local partition and global partition. Embodiments of the present invention provide mechanisms to avoid outages due to skewed space distribution in different database tablespaces or compartments. Embodiments of the present invention provide options to configure, enable, or disable the capacity management features and thresholds for databases, tablespaces or partitions, both individually and globally for all databases, tablespaces or partitions.

The present invention will now be described in detail with reference to the Figures. FIG. 1 is a functional block diagram illustrating a data processing environment, generally designated 100, in accordance with one embodiment of the present invention. FIG. 1 provides only an illustration of one implementation and does not imply any limitations with regard to the systems and environments in which different embodiments can be implemented. Many modifications to the depicted embodiment can be made by those skilled in the art without departing from the scope of the invention as recited by the claims.

An embodiment of data processing environment 100 includes computer 110, interconnected over network 102. Network 102 can be, for example, a local area network (LAN), a telecommunications network, a wide area network (WAN) such as the Internet, or any combination of the three, and include wired, wireless, or fiber optic connections. In general, network 102 can be any combination of connections and protocols that will support communications between computer 110 and any other computer connected to network 102, in accordance with embodiments of the present invention.

In example embodiments, computer 110 can be a laptop, tablet, or netbook personal computer (PC), a desktop computer, a personal digital assistant (PDA), a smart phone, or any programmable electronic device capable of communicating with any computing device within data processing environment 100. In certain embodiments, computer 110 collectively represents a computer system utilizing clustered computers and components (e.g., database server computers, application server computers, etc.) that act as a single pool of seamless resources when accessed by elements of data processing environment 100, such as in a cloud computing environment. In general, computer 110 is representative of any electronic device or combination of electronic devices capable of executing computer readable program instructions. Computer 110 can include components as depicted and described in further detail with respect to FIG. 3, in accordance with embodiments of the present invention.

Computer 110 includes database 120 and database management program (DMP) 130. DMP 130 is a program, application, or subprogram of a larger program that optimizes free space in database 120 by cross-tablespace block allocations using bitmaps. Database 120 stores information in a structured manner on computer 110.

Database 120 resides on computer 110. In an alternative embodiment, database 120 can reside on another device or computer within data processing environment 100 or any other device not within data processing environment, accessible via network 102. A database is an organized collection of data. Data found in a database is typically organized to model relevant aspects of reality in a way that supports processes requiring the information found in the database. Database 120 can be implemented with any type of storage device capable of storing data that can be accessed and utilized by computer 110, such as a database server, a hard disk drive, or a flash memory. In other embodiments, database 120 can be implemented with multiple storage devices within computer 110.

Alternatively, database 120 can be implemented with any computer readable storage medium as found in the art. For example, the computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Database 120 includes database dictionary 122, database table 124, tablespace 140a, and tablespace 140b. In an alternative embodiment, database 120 can include any number of tablespaces of any size. Database dictionary 122 includes a summary of all space allocated and space available in all of the tablespaces found in the database. Database table 124 includes all information regarding transformation of data and the usage of space between tablespaces and can also be used while checking for interdependencies between tablespaces during database operations like export, backup, and restore at the tablespace levels. Tablespaces 140a and 140b are storage locations in database 120 where objects are kept. An object is a location in memory having a value and possibly referenced by an identifier. An object can be a variable, a data structure, or a function. In the class-based object-oriented programming paradigm, an object can be referred to as a particular instance of a class where the object can be a combination of variables, functions, and data structures. In a relation database management system, an object can be a table or column, or an association between data and a database entity. Tablespace 140a includes local partition 150a, local bitmap 152a, global partition 154a, and global bitmap 156a.

Tablespace 140a is split into two distinct sections, a local partition 150a and a global partition 154a. In other words, each tablespace has a local partition and a global partition. The size of each of these partitions is a configurable parameter that is indicated by a user of DMP 130 upon setup of database 120 and can be changed by the user or DMP 130 due to the needs and requirements of database 120. The storage space of local partition 150a is allocated only to local objects, in other words, objects that are assigned to be stored in tablespace 140a. This is similar to existing uses of database systems. The storage space of global partition 154a is allocated to objects belonging to the same tablespace (i.e., tablespace 140a) or another tablespace (e.g., tablespace 140b) in the same database. The storage space of global partition 154a can be used by another tablespace when the local partition of the other tablespace is not sufficient for the storage needs of that tablespace. DMP 130 maintains two separate bitmaps, local bitmap 152a for local partition 150a and global bitmap 156a for global partition 154a. Local bitmap 152a contains information regarding the space allocation of objects found in local partition 150a. Additionally, local bitmap 152a maintains a list of free blocks in local partition 150a and percent of space used and percent of free space of local partition 150a. Global bitmap 156a contains information regarding the space allocation of objects found in global partition 154a. Additionally, global bitmap 156a maintains a list of free blocks in the global partition 154a and percent of space used and percent of free space of global partition 154a. The information found in local bitmap 152a and global bitmap 156a regarding free blocks, percent of space used and percent of free space in local partition 150a and global partition 154a is shared with database dictionary 122, discussed previously. In an embodiment, local bitmap 152a and global bitmap 156a are stored in the file headers of tablespace 140a.

Tablespace 140b includes local partition 150b, similar to local partition 150a, discussed previously. Tablespace 140b includes local bitmap 152b, similar to local bitmap 152a, discussed previously. Tablespace 140b includes global partition 154b, similar to global partition 154a, discussed previously. Tablespace 140b includes global bitmap 156b, similar to global bitmap 156a, discussed previously.

Database dictionary 122 includes at least one of the following tables. First, chained_tablespaces is a table that contains information on the chained tablespaces or tablespaces that are working together. This table is maintained and periodically updated by DMP 130. Second, candidate_supplier_tablespaces is a table that stores information about the tablespaces that have free space in their global partition that is large enough to be allocated to other tablespaces to fulfill their capacity issues. The global partitions that have free space in their global partitions that is large enough to be allocated to other tablespaces is also known as the global storage pool. Third, resized_partition_tablespace is a table that stores information about the tablespaces that have their local and global partitions resized to meet higher space requirements of objects belonging to the same tablespace.

Additionally, database dictionary 122 will include the percent used and percent free thresholds for each local partition in each tablespace, the percent used and percent free thresholds for each global partition, the free space threshold for every tablespace, and the percent of a tablespace that is eligible to be shared. The percent used and percent free threshold for each local partition (PCTUL/ PCTFL) in each tablespace is used by DMP 130 to determine when space is becoming exhausted in a particular local partition, and the space allocation process will start expanding the local partition of the tablespace by using the free space in the global partition of the same tablespace. The percent used and percent free threshold for each global partition (PCTUG/PCTFG) in each tablespace is used by DMP 130 to determine when space is becoming exhausted in a particular global partition, and the space allocation process will start looking for candidate tablespaces that have global partitions with free sufficient space. The percent free space threshold for every tablespace is used by DMP 130 to determine when there is enough free space in a tablespace to reclaim data that is being stored in the global partition of another tablespace and move the information to the local partition or global partition of the original tablespace where the information was supposed to be located. The percent of a tablespace that is eligible to be shared is the percentage of tablespace that can be made into the global partition of that tablespace and allowed to be shared with other tablespaces should they have capacity issues. In an embodiment, the thresholds can apply to all tablespaces and partitions in the database. In an alternative embodiment, individual tablespaces and individual partitions can have different thresholds.

DMP 130 optimizes the free space in database 120. DMP 130 determines a database, tablespaces, and partitions to manage. In an embodiment, the user, using a user interface discussed below, indicates to DMP 130 which database, tablespaces, and partitions to manage. In an alternative embodiment, DMP 130 searches computer 110 or any other computer connected to computer 110 via network 102, and a user, via user interface discussed below, can choose the database, tablespaces, and partitions to manage. In an embodiment, DMP 130 can move data and objects into and out of tablespaces and partitions of the tablespaces (i.e., add or delete data or objects). DMP 130 monitors the database and determines if there is a capacity threat to any of the tablespaces or partitions of the tablespaces. If there is a capacity threat to any of the tablespaces, DMP 130 identifies the space requirement to overcome the capacity threat and then determines global partitions of other tablespaces that can provide the needed capacity to overcome the threat. DMP 130 then moves the data from the tablespace with the capacity to the determined global partitions of other tablespaces and updates the database. If there is no capacity threat to any of the tablespaces, DMP 130 determines if any of the local partitions have a percent free of space that is above a threshold. If it is not determined that there is a local partition that has a percent free of space that is above a threshold, DMP 130 continues to monitor the database. If it is determined that there is a local partition that has a percent free of space that is above a threshold, DMP 130 determines the information to reclaim from global partitions to the local partition and then updates the database for any actions that occur.

A user interface (not shown) is a program that provides an interface between a user and DMP 130. A user interface refers to the information (such as graphic, text, and sound) a program presents to a user and the control sequences the user employs to control the program. There are many types of user interfaces. In one embodiment, the user interface can be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computer, GUIs were introduced in reaction to the perceived steep learning curve of command-line interfaces, which required commands to be typed on the keyboard. The actions in GUIs are often performed through direct manipulation of the graphics elements.

Figure 2:
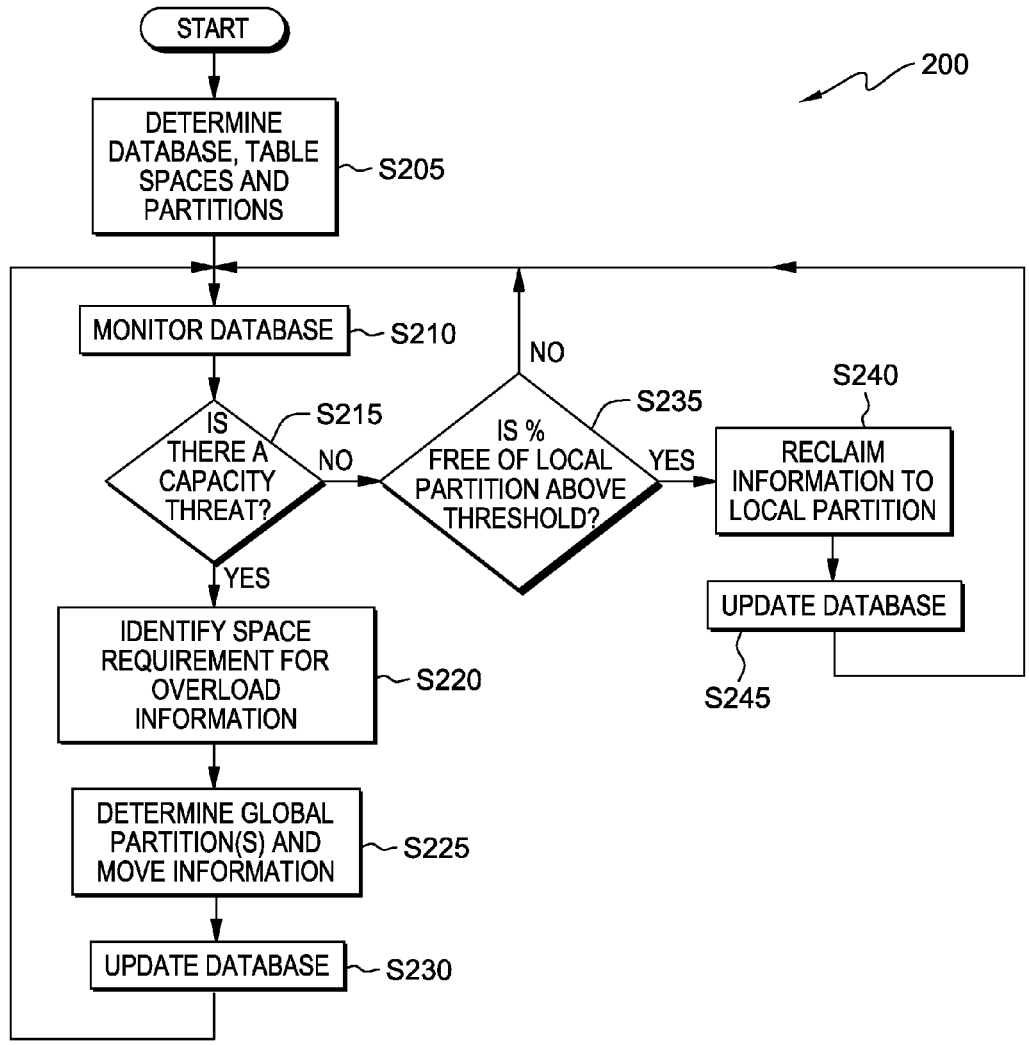
FIG. 2 is a flowchart depicting operational steps for optimizing free space in a database, in accordance with an embodiment of the present invention.

FIG. 2 is a flowchart of workflow 200 depicting operational steps for optimizing free space in a database, in accordance with an embodiment of the present invention. In one embodiment, the steps of the workflow are performed by DMP 130. Alternatively, steps of the workflow can be performed by any other program while working with DMP 130. In an embodiment, DMP 130 can invoke workflow 200 upon receiving a request to monitor database 120 which includes tablespace 140*a* and 140*b* including their respective partitions. In an alternative embodiment, DMP 130 can invoke workflow 200 upon the initialization, setup, or creation of database 120 including the creating of tablespace 140*a* and 140*b* including their respective partitions. A user, via the user interface discussed previously, can change, edit or modify any aspects of databases, tablespaces, partitions, bitmaps, database dictionaries, or database tables at any time or during any step of workflow 200.

For example, a user can change any of the thresholds. In yet another example, the user can expand the size of the database to include more tablespaces. In even yet another example, a program can add free space to a tablespace and DMP 130 can distribute the free space between the local partition and global partition using at least one or more of the following factors: amount of space added, thresholds set for the size of partitions in a database, percent of space utilized currently, rate of space being used in the partitions. Alternatively, the user can bypass DMP 130 and allocate the free space any way the user chooses.

DMP 130 determines database, tablespaces and partitions (step S205). DMP 130 receives a request from a user, via the user interface discussed previously, or from another program to monitor at least one database. For example, DMP 130 can monitor database 120. In an alternative embodiment, DMP 130 can monitor more than one database on computer 110. In yet another embodiment, DMP 130 can monitor one or more databases accessible via network 102. The request can be to monitor all tablespaces in a database. For example, DMP 130 can monitor tablespace 140*a* and 140*b*. In an alternative embodiment, the request can be to monitor some tablespaces in a database but not all tablespaces. In an embodiment, the size of the tablespaces can be predetermined based on the previous utilization of the database. In an alternative embodiment, a user, via the user interface discussed previously, can modify the size of the tablespaces.

In an embodiment, the database can already have tablespaces with local and global partitions and their associated bitmaps. For example, tablespace 140*a* includes local partition 150a, local bitmap 152a, global partition 154a, and global bitmap 156a, and tablespace 140b includes local partition 150b, local bitmap 152b, global partition 154b, and global bitmap 156b. In an alternative embodiment, the database can only include tablespaces, and DMP 130 creates a local partition, local bitmap, global partition, and global bitmap for each tablespace in the database. In an embodiment, DMP 130 can modify the sizes of the local partitions and global partitions depending on user input or based on the space requirement and consumption rate of objects belonging in tablespace.

In an embodiment, DMP 130 will also determine a database dictionary and database table for the database. For example, database dictionary 122 and database table 124 found in database 120. In an embodiment, database dictionary 122 and database table 124 are already created and associated with database 120. In an alternative embodiment, upon DMP 130 creating a local partition, local bitmap, global partition, and global bitmap for each tablespace in the database, DMP can also create database dictionary 122 and database table 124 using information associated with database 120 or using information input by a user, via the user interface discussed previously. Database dictionary 122 can include information about which tablespaces (e.g., tablespace 140a and 140b) that are in the same database (e.g., database 120) and work together sharing global partitions (e.g., global partition 154a and 154b) to optimize free space in the database. Database dictionary 122 can include information about which tablespaces have free space in their global partition that is large enough to be allocated to other tablespaces to fulfill their capacity issues. For example, database 120 includes global partition 154a which is indicated in database dictionary 122 as having sufficient free space to be allocated to tablespace 140b to fulfill the capacity issues of local partition 150b. Database dictionary 122 can include information about tablespaces that have their local and global partitions resized to meet higher space requirement of objects belonging to the same tablespace. For example, if tablespace 140a required the resizing of local partition 150a to fulfill the size requirements of an object to be stored in the tablespace, then it would be recorded in database dictionary 122. Database table 124 includes information about data that has been stored in a global partition of another tablespace due to the local partition of the tablespace the data was supposed to be stored in reaching capacity. For example, database table 124 could record that an object that was initially to be stored on local partition 150b of tablespace 140b but was stored in global partition 154a of tablespace 140a due to capacity issues in local partition 150b.

In an embodiment, DMP 130 will also update the database dictionary 122 for the thresholds. The thresholds, discussed previously, are the PCTUG/PCTFG, PCTUL/PCTFL, and free space threshold for every tablespace in database 120. In an embodiment, the thresholds are already associated with database 120 when DMP 130 receives monitory authority for the database. The thresholds are then incorporated into database dictionary 122 or can already be included in database dictionary. In an alternative embodiment, a user, via the user interface discussed previously, can indicate the thresholds and DMP 130 records this information in database dictionary 122.

DMP 130 monitors database 120 (step S210). In other words, DMP 130 monitors all objects being stored in all tablespaces found in database 120 and any changes that are made to the objects being stored in the tablespaces found in database 120. For example, DMP 130 monitors local partition 150a and global partition 154a of tablespace 140a and local partition 150b and global partition 154b of tablespace 140b. If an object is stored in local partition 150a, then DMP 130 updates local bitmap 152a along with database dictionary 122 and database table 124 entries about local partition 150a. When DMP 130 determines that the percent of space used of local partition 150a is above the PCTUL of local partition 150a, the local partition 150a of tablespace 140a is supplemented using the free space of global partition 154a of tablespace 140a. In other words, DMP 130 can now store at least a portion of the objects that were going to be stored in local partition 150a of tablespace 140 in the global partition 154a of tablespace 140a if the percent used of global partition 154a is below the threshold. A portion of the object may be stored in local partition 150a of tablespace 140. The free space of global partition 154a is determined using global bitmap 156a. DMP 130 calculates the optimal size of free space of global partition 154a to be migrated and used instead of local partition 150a using one or more of the following: percent free space of global partition, size of tablespace the local and global partitions are found in, size of global partition, size of local partition, and rate of growth of the tablespace. Rate of growth of the tablespace indicates how fast the percentage of free space is being utilized in the local partition. Rate of growth of the tablespace is the rate at which the local partition in the tablespace is being filled with new data or object being stored in the tablespace or when existing data or objects in a tablespace are modified and the modified data or objects occupy more space as compared to the original data or object. DMP 130 updates database dictionary 122 and database table 124 for any changes to the sizes of local partition 150a or global partition 154a.

DMP 130 determines if there is a capacity threat (decision block S215). DMP 130 determines if any of the tablespaces in database 120 have a percent free space less than the threshold for the particular tablespace. For example, tablespace 140a can have a percent free threshold, as found in database dictionary 122, of twenty percent. DMP 130 compares the percent free space of tablespace 140a to the threshold of twenty percent. For example, if tablespace 140a has a nineteen percent free space then DMP 130 determines that this is below the threshold of twenty percent, and therefore there is a capacity threat.

If DMP 130 determines there is a capacity threat (decision block S215, yes branch), DMP 130 identifies the space requirement for the overload information (step S220). In other words, DMP 130 determines what objects are trying to be stored on the tablespace that has a capacity threat, and then DMP 130 determines the size of space needed to satisfy the size requirements of the objects to be stored and any potential objects that are needed to be stored on the tablespace. The size of space needed to satisfy the size requirements of the object to be stored and any potential objects that are needed to be stored on the tablespace can be determined using at least one or more of the following: business requirement of the application, application specific architect decisions, size of tablespace, free space available in tablespace, size of local and global partitions, free space available in local and global partitions, and growth predictions.

DMP 130 determines global partition(s) and moves the information (step S225). In other words, DMP 130 determines which global partition(s) will be used to solve the capacity threat determined previously. In an embodiment, DMP 130 can determine a single global partition in another tablespace to solve the capacity threat. For example, if tablespace 140a has a capacity threat then global partition 154b can be determined to solve that capacity threat. In an alternative embodiment, DMP 130 can determine more than one global partition in another tablespace to solve the capacity threat.

DMP 130 determines the global partition(s) to be used to solve the capacity threat based on at least one or more of the following factors: percent space used in the tablespaces, size of the tablespaces, size of the global partition in the tablespaces, space requirement for the overload information, the percent of a tablespace that is eligible to be shared, and size of local partition in the tablespaces. A user, via user interface discussed previously, at the beginning of monitoring a database or at any time during the monitoring of a database can indicate to DMP 130 which factors to weight more or less heavily for determining the global partition(s) or can indicate certain factors not to consider at all. DMP 130 then determines the optimal global partition(s) to be used to solve the capacity threat.

Based on the determined optimal global partition(s) to be used to solve the capacity threat, at least a portion of the overload information is then stored in those determined optimal global partition(s). The global bitmap(s) for the global partition(s) are also updated accordingly. For example, if it is determined that tablespace 140a has a capacity threat, and it is also determined that global partition 154b of tablespace 140b is the optimal global partition to remedy that capacity threat, then the overload information is stored in global partition 154b of tablespace 140b, and global bitmap 156b is updated accordingly. In an embodiment, DMP 130 can also indicate to store any new information that is supposed to be stored in the tablespace with the capacity threat in the determined optimal global partition(s). In an embodiment, a portion of the object may be stored in local partition 150a of tablespace 140a.

DMP 130 updates the database (step S230). In other words, DMP 130 updates the database for any actions that occurred due to the capacity threat. For example, as discussed previously, global partition 154b of tablespace 140b is used to remedy a capacity threat in tablespace 140a. DMP 130 updates database dictionary 122 and database table 124 accordingly. For example, database dictionary 122 can be updated to indicate that global partition 154b, due to the new information being stored on within global partition 154b, does not have enough free space to be allocated to other tablespaces to fulfill their capacity issues. For example, database table 124 is updated to indicate that global partition 154b of tablespace 140b is being used by and shared with tablespace 140a to solve capacity issues. In an embodiment, information can be written to database logs (not shown) that will be picked up by monitoring software (not shown), and this information is relayed to users (e.g., database management professionals/experts/operators) so they can plan and allocate space to the tablespace that ran out of free space and had to borrow space from a global partition of another tablespace. DMP 130 can then continue to monitor the database (step S210).

If DMP 130 determines there is no capacity threat (decision block S215, no branch), DMP 130 determines if the percent free of local partition is above a threshold (decision block S235). In other words, DMP 130 determines the tablespaces that have, due to a capacity threat, had information stored on a global partition of another tablespace. DMP 130 then determines if those tablespaces have a percent free of their local partition above a threshold. For example, DMP determines that tablespace 140a has information stored on global partition 154b of tablespace 140b and that the percent free of local partition 150a is fifty percent, and the threshold is thirty percent. If DMP 130 determines the percent free of local partition is below a threshold (decision block S235, no branch) DMP 130 continues to monitor database (step S210).

If DMP 130 determines the percent free of local partition is above a threshold (decision block S235, yes branch) DMP 130 reclaims information to local partition (step S240). In other words, DMP 130 determines there is enough free space above a threshold in a tablespace that information that couldn't be stored in that tablespace previously due to capacity issues and had to be stored in global partitions of other tablespaces can now be moved back to the local partition of the tablespace that had the capacity issues because the capacity issues do not exist anymore. For example, tablespace 140a previously had capacity issues and had to store some information on global partition 154b of tablespace 140b. Tablespace 140a has freed up some space in local partition 150a, and the free space is now above the threshold. The information stored of tablespace 140a that was stored on global partition 154b of tablespace 140b is moved to local partition 150a of tablespace 140a. Once the information has been transferred, local bitmap 152a and global bitmap 156b are updated accordingly.

The rate of transfer from global partitions to local partitions is controlled by DMP 130. DMP 130 will calculate the optimal rate of transfer based on one or more of the following: bandwidth available, the load on tablespace 140a and 140b, database 120 and/or computer 110, and the behavior of the application or program that uses the information. The load on tablespace 140a and 140b, database 120 and/or computer 110 can include factors like CPU utilization, input/output requests, or memory utilization. For example, if the load is high then the transfer can be slow. Additionally, the rate of transfer can be modified by the user, via user interface discussed previously. For example, the user can setup a threshold or parameter for all transfers or can determine a transfer rate on a case by case basis.

DMP 130 updates the database (step S245). In other words, DMP 130 updates the database for any actions that occurred due reclaiming information to the local partition. For example, as discussed previously, information on global partition 154b of tablespace 140b is moved to local partition 150a of tablespace 140a. DMP 130 updates database dictionary 122 and database table 124 accordingly. For example, database dictionary 122 can be updated to indicate that global partition 154b, due to the information being moved from global partition 154b, does have enough free space to be allocated to other tablespaces to fulfill their capacity issues. For example, database table 124 is updated to indicate that global partition 154b of tablespace 140b is not being used by and shared with tablespace 140a to solve capacity issues. In an embodiment, information can be written to database logs (not shown) that will be picked up by monitoring software (not shown) and this information is relayed to users (e.g., database management professionals/experts/operators) so they can plan and allocate space to the tablespace that not have free space and don't have to borrow space from a global partition of another tablespace. DMP 130 can then continue to monitor the database (step S210).

Figure 3:
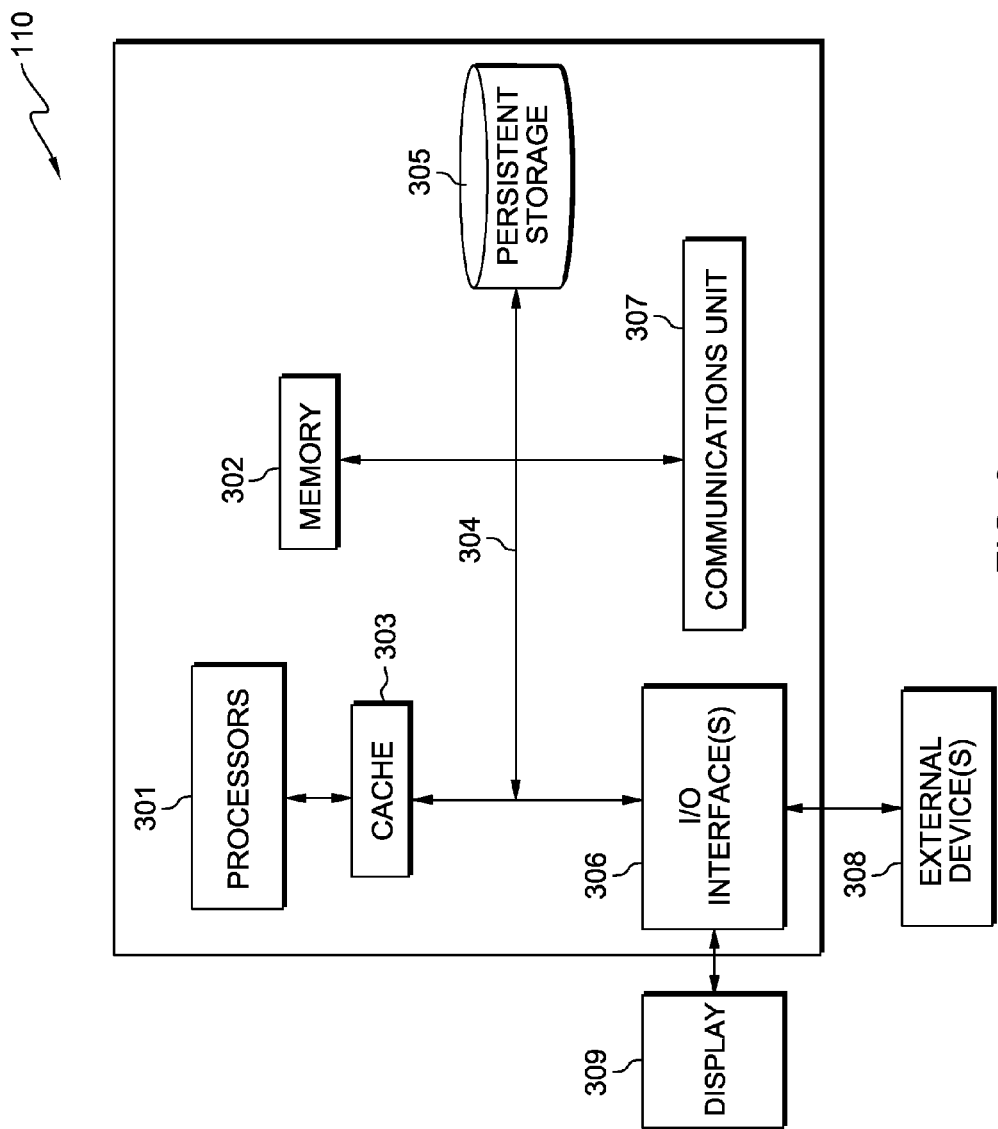
FIG. 3 depicts a block diagram of components of the computer of FIG. 1, in accordance with an embodiment of the present invention.

FIG. 3 depicts computer 110 that is an example of a computing system that includes DMP 130. Computer 110 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing free space in a database, the method comprising the steps of:
   identifying, by one or more computer processors, a database, wherein the database has two or more tablespaces;
   creating, by one or more computer processors, a local partition and a global partition for each tablespace of the two or more tablespaces, wherein the created two or more global partitions are included in a global storage pool;
   receiving, by one or more computer processors, a request to move an object to a first local partition of a first tablespace of the two or more tablespaces;
   determining, by one or more computer processors, that an amount of used space of the first local partition is above a first threshold;
   responsive to determining that the amount of used space of the first local partition is above the first threshold;
   determining, by one or more computer processors, that an amount of free space of the first tablespace is less than a third threshold;
   responsive to determining that the amount of free space of the first tablespace is less than the third threshold, determining, by one or more computer processors, a space requirement for the object using one or more of the following: business requirements of an application using the object or growth predictions of size requirements for objects in the tablespace where the object is stored;
   responsive to determining the space requirement for the object, determining, by one or more computer processors, at least one of the global partitions in the global storage pool that is available to store at least a portion of the object based on the determined space requirement; and
   storing, by one or more computer processors, at least a portion of the object in the determined at least one of the global partitions.

2. The method of claim 1, wherein storing at least a portion of the object in the global storage pool comprises:
   determining, by one or more computer processors, that an amount of used space of a first global partition of the first tablespace is less than a second threshold; and
   responsive to determining that the amount of used space of the first global partition of the first tablespace is less than a second threshold, storing, by one or more computer processors, at least a portion of the object in the first global partition of the first tablespace.

3. The method of claim 1, further comprising:
   determining, by one or more computer processors, that an amount of free space of the first local partition is above a fourth threshold; and
   responsive to determining the amount of free space of the first local partition is above the fourth threshold, moving, by one or more computer processors, at least a portion of the object stored in the determined at least one of the global partitions to the first local partition.

4. The method of claim 1, wherein each local partition of each tablespace of the two or more tablespaces has a local bitmap associated with each local partition that includes information regarding space allocation of objects found in an associated local partition and each global partition of each tablespace of the two or more tablespaces has a global bitmap associated with each global partition that includes information regarding space allocation of objects found in an associated global partition.

5. The method of claim 1, wherein determining at least one global partition in the global storage pool that is available to store at least a portion of the object also comprises one or more of the following: a percent of space used in the tablespace that allows for the storage of the object, a size of the tablespace that allows for the storage of the object, a size of a global partition in the tablespace that allows for the storage of the object, the percent of space eligible to be shared of the tablespace that allows for the storage of the object, and the size of a local partition in the tablespace that allows for the storage of the object.

6. A computer program product for optimizing free space in a database, the computer program product comprising:
one or more computer readable storage media; and
program instructions stored on the one or more computer readable storage media, the program instructions comprising:
program instructions to identify a database, wherein the database has two or more tablespaces;
program instructions to create a local partition and a global partition for each tablespace of the two or more tablespaces, wherein the created two or more global partitions are included in a global storage pool;
program instructions to receive a request to move an object to a first local partition of a first tablespace of the two or more tablespaces;
program instructions to determine that an amount of used space of the first local partition is above a first threshold;
program instructions, responsive to determining that the amount of used space of the first local partition is above the first threshold;
program instructions to determine that an amount of free space of the first tablespace is less than a third threshold;
program instructions, responsive to determining that the amount of free space of the first tablespace is less than the third threshold, to determine a space requirement for the object using one or more of the following: business requirements of an application using the object or growth predictions of size requirements for objects in the tablespace where the object is stored;
program instructions, responsive to determining the space requirement for the object, to determine at least one of the global partitions in the global storage pool that is available to store at least a portion of the object based on the determined space requirement; and
program instructions to store at least a portion of the object in the determined at least one of the global partitions.

7. The computer program product of claim 6, wherein the program instructions to store at least a portion of the object in the storage pool comprise:
program instructions to determine that an amount of used space of a first global partition of the first tablespace is less than a second threshold; and
program instructions, responsive to determining that the amount of used space of the first global partition of the first tablespace is less than a second threshold, to store at least a portion of the object in the first global partition of the first tablespace.

8. The computer program product of claim 6, further comprising program instructions, stored on the one or more computer readable storage media, to:
determine that an amount of free space of the first local partition is above a fourth threshold; and
responsive to determining the amount of free space of the first local partition is above the fourth threshold, move at least a portion of the object stored in the determined at least one of the global partitions to the first local partition.

9. The computer program product of claim 6, wherein each local partition of each tablespace of the two or more tablespaces has a local bitmap associated with each local partition that includes information regarding space allocation of objects found in an associated local partition and each global partition of each tablespace of the two or more tablespaces has a global bitmap associated with each global partition that includes information regarding space allocation of objects found in an associated global partition.

10. The computer program product of claim 6, wherein determining at least one global partition in the global storage pool that is available to store at least a portion of the object also comprises one or more of the following: a percent of space used in the tablespace that allows for the storage of the object, a size of the tablespace that allows for the storage of the object, a size of a global partition in the tablespace that allows for the storage of the object, the percent of space eligible to be shared of the tablespace that allows for the storage of the object, and the size of a local partition in the tablespace that allows for the storage of the object.

11. A computer system for optimizing free space in a database, the computer system comprising:
one or more computer processors;
one or more computer readable storage media; and
program instructions, stored on the one or more computer readable storage media for execution by at least one of the one or more computer processors, the program instructions comprising:
program instructions to identify a database, wherein the database has two or more tablespaces;
program instructions to create a local partition and a global partition for each tablespace of the two or more tablespaces, wherein the created two or more global partitions are included in a global storage pool;
program instructions to receive a request to move an object to a first local partition of a first tablespace of the two or more tablespaces;
program instructions to determine that an amount of used space of the first local partition is above a first threshold; and
program instructions, responsive to determining that the amount of used space of the first local partition is above the first threshold;
program instructions to determine that an amount of free space of the first tablespace is less than a third threshold;
program instructions, responsive to determining that the amount of free space of the first tablespace is less than the third threshold, to determine a space requirement for the object using one or more of the following: business requirements of an application using the object or growth predictions of size requirements for objects in the tablespace where the object is stored;
program instructions, responsive to determining the space requirement for the object, to determine at least one of the global partitions in the global storage pool that is available to store at least a portion of the object based on the determined space requirement; and program instructions to store at least a portion of the object in the determined at least one of the global partitions.

12. The computer system of claim 11, wherein the program instructions to store at least a portion of the object in the storage pool comprise:

program instructions to determine that an amount of used space of a first global partition of the first tablespace is less than a second threshold; and program instructions, responsive to determining that the amount of used space of the first global partition of the first tablespace is less than a second threshold, to store at least a portion of the object in the first global partition of the first tablespace.

13. The computer system of claim 11, further comprising program instructions, stored on the one or more computer readable storage media for execution by at least one of the one or more computer processors, to:

determine that an amount of free space of the first local partition is above a fourth threshold; and responsive to determining the amount of free space of the first local partition is above the fourth threshold, move at least a portion of the object stored in the determined at least one of the global partitions to the first local partition.

14. The computer system of claim 11, wherein each local partition of each tablespace of the two or more tablespaces has a local bitmap associated with each local partition that includes information regarding space allocation of objects found in an associated local partition and each global partition of each tablespace of the two or more tablespaces has a global bitmap associated with each global partition that includes information regarding space allocation of objects found in an associated global partition.

15. The computer system of claim 11, wherein determining at least one global partition in the global storage pool that is available to store at least a portion of the object also comprises one or more of the following: a percent of space used in the tablespace that allows for the storage of the object, a size of the tablespace that allows for the storage of the object, a size of a global partition in the tablespace that allows for the storage of the object, the percent of space eligible to be shared of the tablespace that allows for the storage of the object, and the size of a local partition in the tablespace that allows for the storage of the object.

* * * * *